United States Patent
Winther et al.

(10) Patent No.: US 9,312,738 B2
(45) Date of Patent: Apr. 12, 2016

(54) LINEAR ACTUATOR

(75) Inventors: Henrik Winther, Nordborg (DK);
Torben Iversen, Nordborg (DK)

(73) Assignee: Linak A/S, Nordborg (DK)

( * ) Notice: Subject to any disclaimer, the term of this patent is extended or adjusted under 35 U.S.C. 154(b) by 736 days.

(21) Appl. No.: 13/509,335

(22) PCT Filed: Nov. 11, 2010

(86) PCT No.: PCT/DK2010/000147
§ 371 (c)(1),
(2), (4) Date: May 11, 2012

(87) PCT Pub. No.: WO2011/057631
PCT Pub. Date: May 19, 2011

(65) Prior Publication Data
US 2012/0222509 A1    Sep. 6, 2012

(30) Foreign Application Priority Data

Nov. 13, 2009   (DK) .......................... PA 2009 01212

(51) Int. Cl.
*F16H 19/02*      (2006.01)
*H02K 7/06*       (2006.01)
*F16H 25/20*      (2006.01)

(52) U.S. Cl.
CPC ................ *H02K 7/06* (2013.01); *F16H 25/20* (2013.01); *F16H 2025/209* (2013.01); *F16H 2025/2031* (2013.01); *F16H 2025/2037* (2013.01); *F16H 2025/2081* (2013.01); *Y10T 74/18568* (2015.01)

(58) Field of Classification Search
CPC .......................... F16H 2025/2031; F16H 25/20
USPC ....................................................... 74/89.23
See application file for complete search history.

(56) References Cited

U.S. PATENT DOCUMENTS

| | | | |
|---|---|---|---|
| 4,858,481 A | 8/1989 | Abraham | |
| 5,809,833 A | 9/1998 | Newport et al. | |
| 7,066,041 B2 | 6/2006 | Nielsen | |
| 7,971,937 B2 | 7/2011 | Ishii et al. | |
| 2009/0293655 A1* | 12/2009 | Tseng et al. ................. | 74/89.37 |
| 2010/0236342 A1* | 9/2010 | Tseng .............................. | 74/89 |

FOREIGN PATENT DOCUMENTS

| | | |
|---|---|---|
| EP | 0531247 | 3/1993 |
| WO | 2004028305 | 4/2004 |
| WO | 2010006518 | 1/2010 |

OTHER PUBLICATIONS

English Abstract of WO 2010006518.

* cited by examiner

Primary Examiner — Terence Boes
(74) Attorney, Agent, or Firm — Dykema Gossett PLLC

(57) ABSTRACT

Linear actuator comprising a housing (1), a reversible electric motor (7), a transmission (22), a spindle (5) driven by the electric motor through the transmission (22), a bearing (31) for embedding the spindle (5), a spindle nut (6) secured against rotation on the spindle, an outer tube (3) surrounding the spindle, an activation element (4) telescopically embedded in the outer tube (3) and connected to the spindle nut (6), a rear mounting (9) designed as a separate element and secured in the housing for mounting of the actuator. The rear mounting (9) is equipped with a seat (35) for the bearing (31) of the spindle. The seat (35) is connected to an opening (36), which is guided out on the side of the rear mounting (9), so that the bearing (31) of the spindle may be inserted sideways in the seat (35). Thus a linear actuator is provided having a rear mounting which is easier to mount and ensures an easier handling during the assembly of the linear actuator.

6 Claims, 5 Drawing Sheets

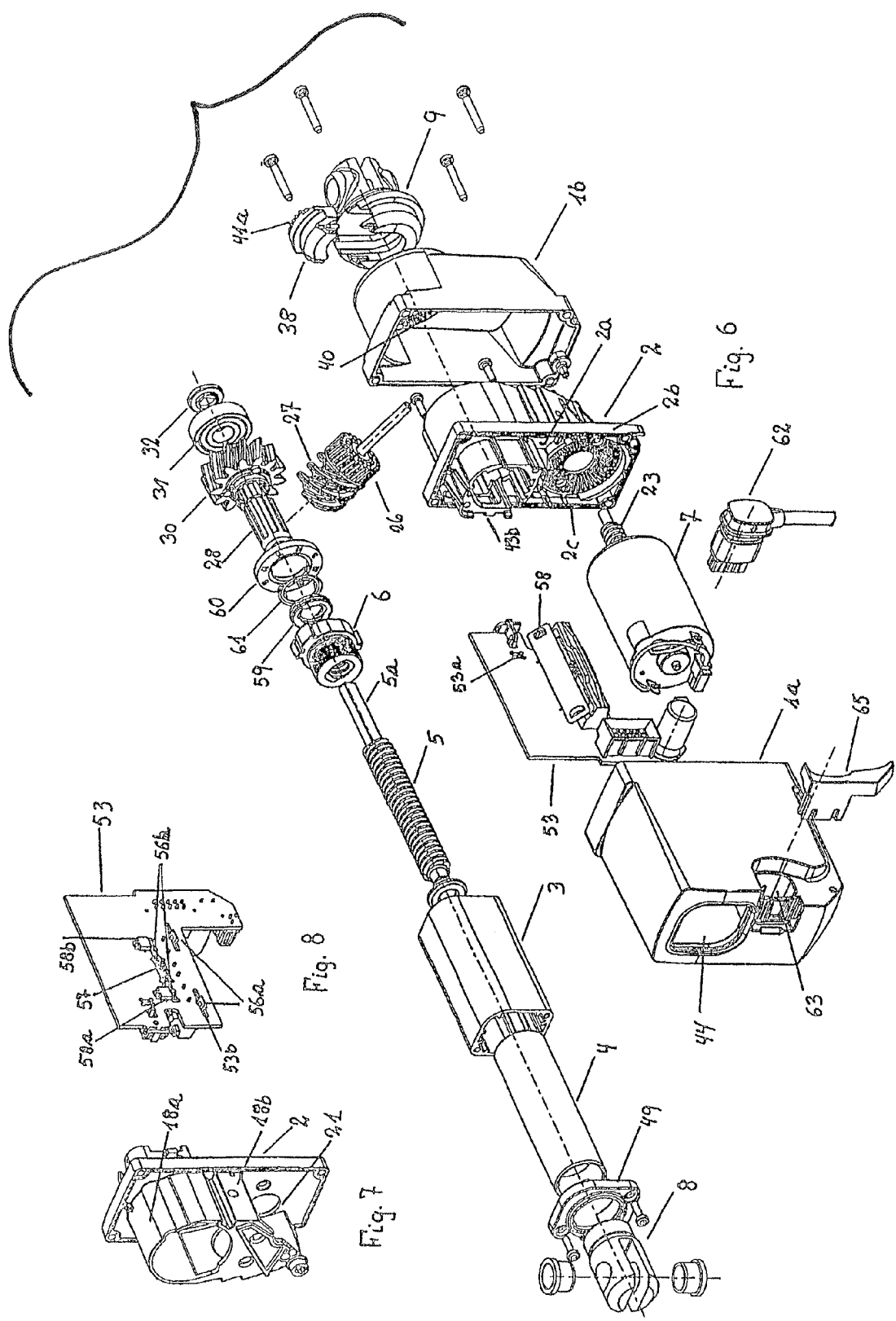

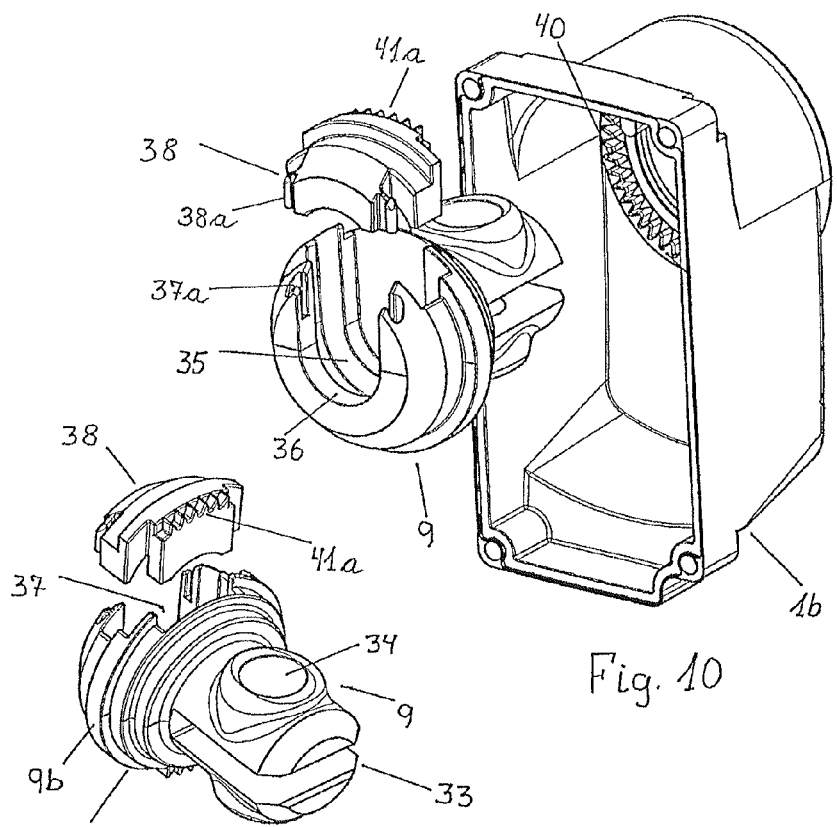
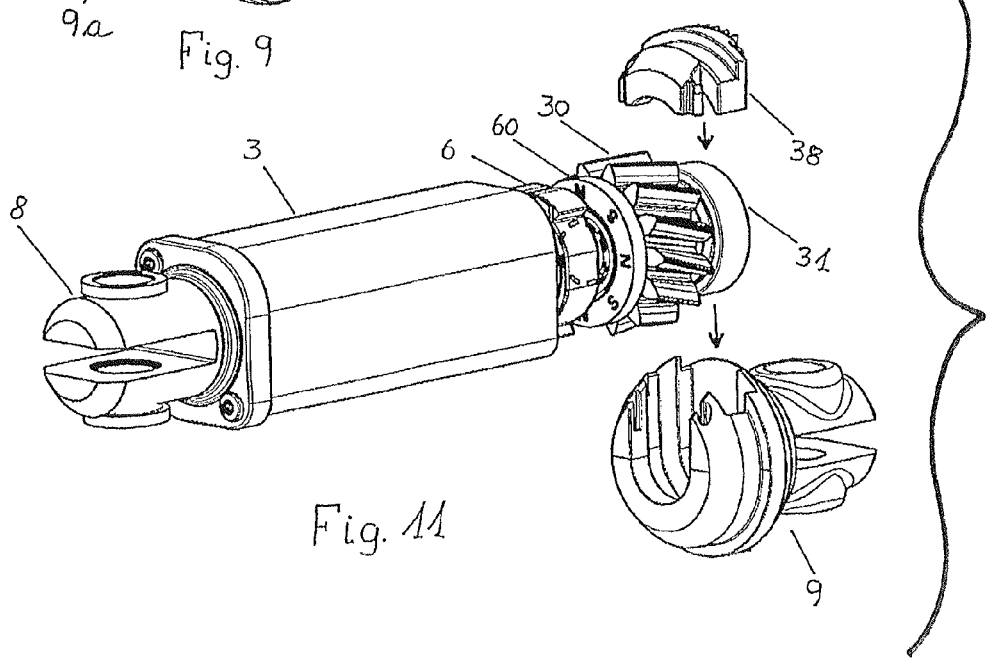

LINEAR ACTUATOR

BACKGROUND OF THE INVENTION

1. Field of the Invention

The present invention relates to a linear actuator.

2. The Prior Art

Linear actuators are widely used in structures where the linear movement can be used for adjusting a movable part of a structure. Thus, linear actuators are used in furniture, hospital and care beds, patient lifters, vehicles, ships and airplanes, machines and processing plants, buildings, etc. The actuator is typically secured to the structure by means of a rear mounting arranged at the back of the actuator and a front mounting on the activation element. The activation element is typically a tubular piston rod, but may also be a particular design of the spindle nut.

EP 0 531 247 B1 Linak A/S discloses an actuator where the rear mounting and the housing of the actuator is moulded as one unit. U.S. Pat. No. 4,858,481 Brunswick Valve & Control, Inc. discloses an actuator where the rear mounting as a separate unit is screwed onto the rear of the housing of the actuator. U.S. Pat. No. 5,809,833, Dana Corp. discloses an actuator where the rear mounting likewise is a separate unit, but is screwed onto an element inside the actuator. The rear mounting is here open in the front, where a bearing at the end of the spindle is positioned in and retained by means of a screwed on plate piece having a through hole for the spindle. WO 02/29284 A1, Linak A/S discloses an actuator, where the rear mounting consists of two halves which are joined in the axial center plane of the rear mounting. The rear mounting is furnished with a seat for a bearing, which is secured to the end of the spindle. All of the above are as such quite good constructions, but somewhat troublesome in terms of manufacturing and assembly as well as expensive.

To be exact, the invention relates to the type of linear actuators where the bearing is positioned in the rear mounting, which provides the advantage that the axial forces from the load on the activation element of the actuator are led directly through the spindle to the bearing of the spindle.

The purpose of the invention is to provide a rear mounting, which is easier to mount and further enables an easier handling during the assembly of the actuator.

SUMMARY OF THE INVENTION

This is achieved according to the invention in that the actuator is constructed such that the seat is connected to an opening which leads out to the side of the rear mounting so that the bearing may be inserted sideways into the seat. This eases the assembly process as the rear mounting with the seat in only one operation is guided over the bearing of the spindle and thus is fixed without the use of tools. In relation to this, it is expedient that the opening is extended all the way to one end of the rear mounting so that the shaft end of the spindle with the attached bearing may be inserted sideways into the rear mounting. The spindle can thus be mounted with various parts including bearing, whereupon the rear mounting is finally led over the bearing.

To prevent the rear mounting from unintentionally falling out of the spindle bearing, the opening may in a further embodiment of the actuator be closed by means of a closing element. In a particularly expedient embodiment the closing element has a tongue at each side, which fits into a spline in the side of the opening. The closing element is thus fixed so that it does not unintentionally fall out during the handling in the assembly process of the actuator.

In a further embodiment of the actuator, a circular opening is constructed in the housing into which the rear mounting is placed. Inside the housing, on the area surrounding the rim along the opening, there is a row of teeth. On the rear mounting, at least over a section, there is a corresponding row of teeth cooperating with the teeth in the housing. Thus, the rear mounting is secured against unintentional rotation about its axial axis. In a further embodiment the rear mounting has two sections with teeth located opposite each other, which provides a sufficiently secure retention against rotation while it further simplifies the manufacturing process. In an embodiment one of the sections with teeth is constructed as a locking element. The teeth further ensure that the rear mounting may be positioned and held in a desired angular position.

BRIEF DESCRIPTION OF THE DRAWINGS

An embodiment of the invention will be described more fully below with reference to the accompanying drawing, in which FIG. 6 shows an exploded view of the actuator, shown from the front, FIG. 7 shows a perspective view of the mounting console, shown from the rear from the opposite side, as shown in FIG. 3, FIG. 8 shows the printed circuit board, shown from the opposite side and end as shown in FIG. 3, FIG. 9 shows a perspective view of the rear mounting and the rear part of the housing, shown from the front of the actuator, FIG. 10 shows a perspective view of the rear mounting, shown towards the rear end of the actuator, and FIG. 11 shows a perspective view of the rear part of the housing, shown from the front of the actuator.

DETAILED DESCRIPTION OF THE PREFERRED EMBODIMENT

Figure 1:
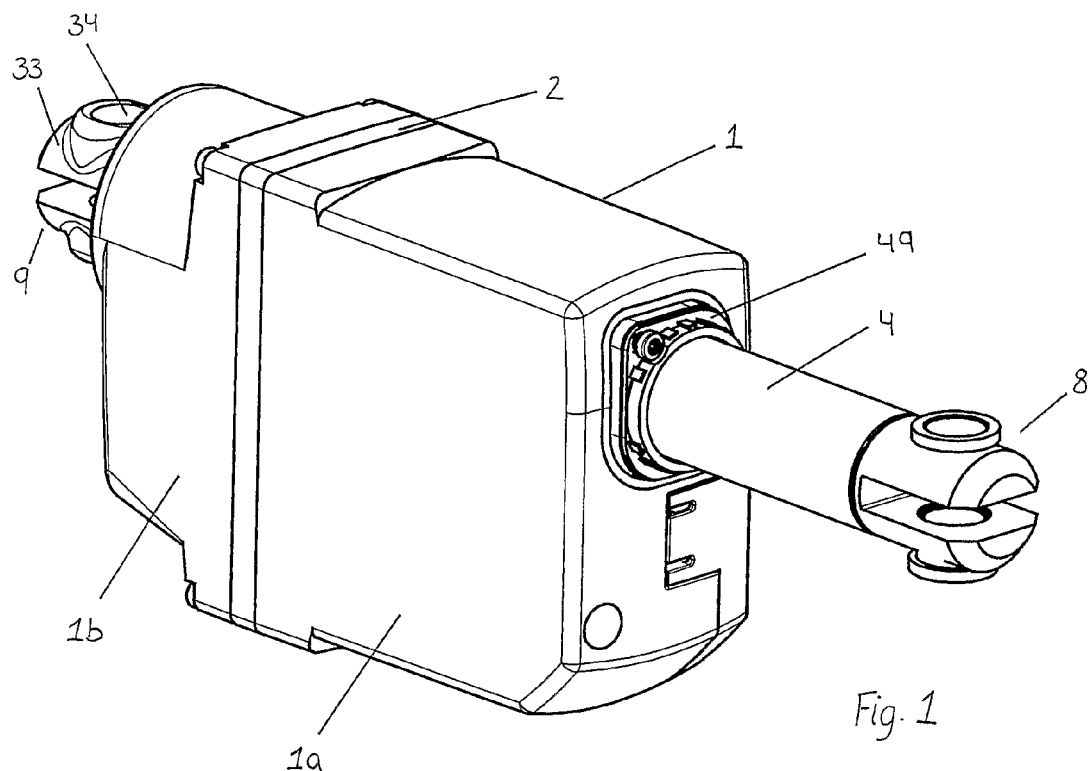
FIG. 1 shows a perspective view of the actuator shown from the front.
Figure 2:
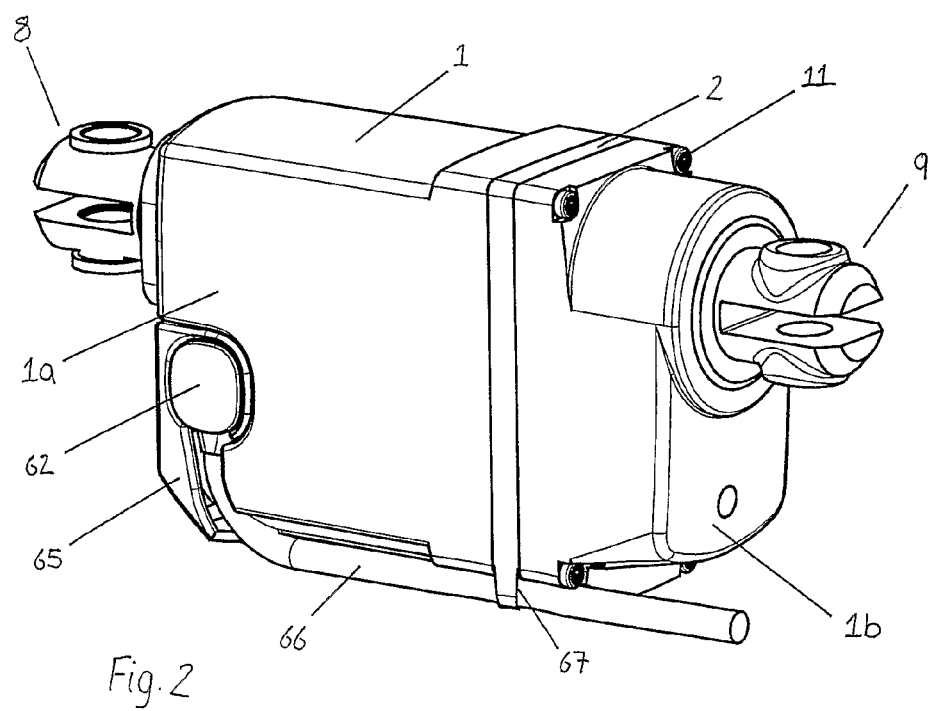
FIG. 2 shows a perspective view of the actuator shown from the rear.

The main components of the actuator shown on the drawings include a two-part outer housing 1, a mounting console 2, an outer tube 3 secured to the mounting console 2 with a rear end, and in which a telescopic tube-shaped activation element 4 (in technical terminology, an inner tube), a spindle 5 with a spindle nut 6 to which the activation element 4 is mounted with a rear end, a reversible low voltage DC motor 7, a front mounting 8 secured to a free front end of the activation element 4 and a rear mounting 9 at a rear end of the outer housing 1.

The two-part outer housing 1 comprises a front part 1 *a* and a rear part 1 *b* assembled around the mounting console 2, having a cross wall 2*a* with a circumferential flange 2*b*, and where the exterior of the flange corresponds to the outer contour of the housing 1. Along the outer side of the circumferential flange 2*b* at each side groove 2*c* for a sealing is arranged. In the corners are through holes 10 for screws 11. The two parts 1*a*,1*b* of the housing 1 are assembled around the mounting console 2 in each corner with the screws 1 at each corner which are inserted through the holes 10 in each corner of the mounting console 2. The screws are inserted from the rear part 1b and are screwed into the front part is of the housing.

Figure 3:
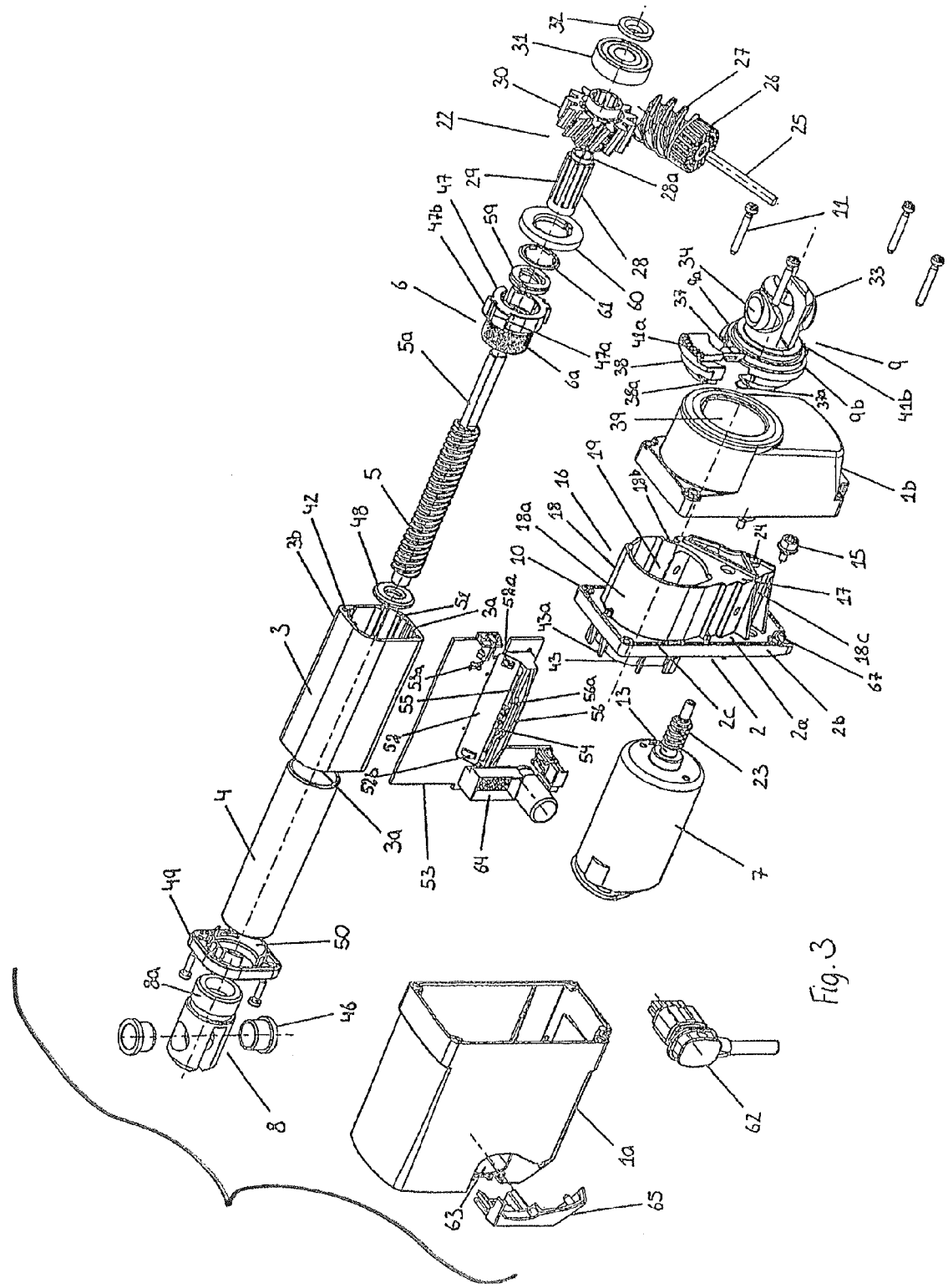
FIG. 3 shows an exploded view of the rear part of the actuator.
Figure 4:
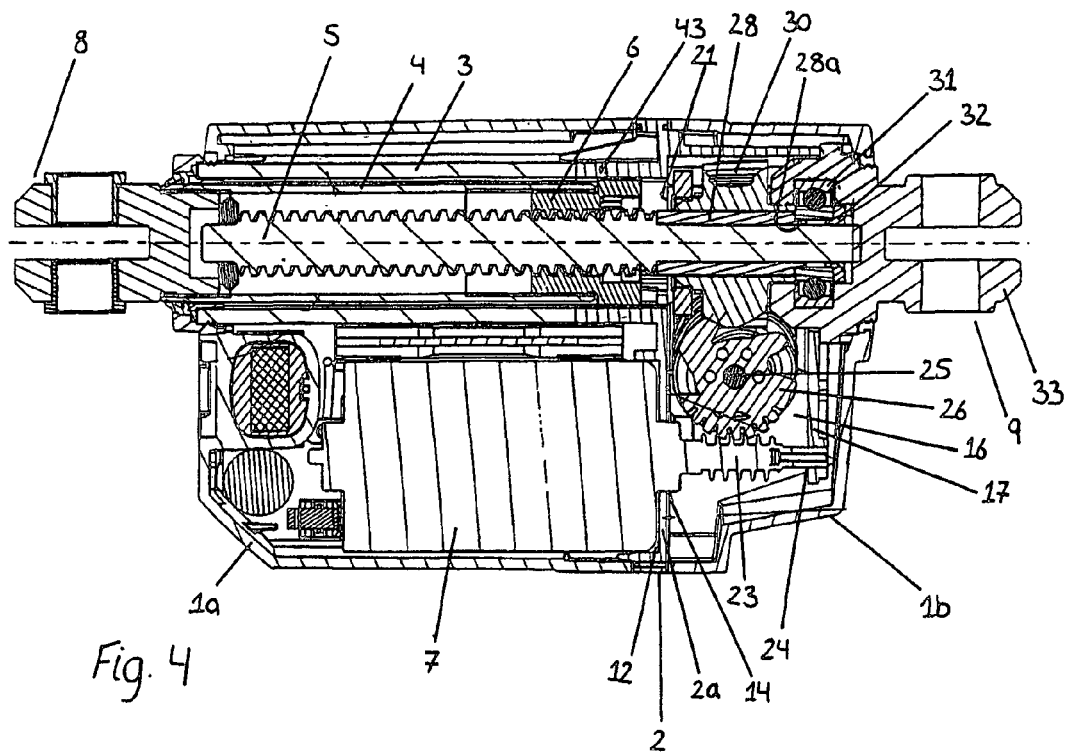
FIG. 4 shows a longitudinal section through the actuator shown from the side.
Figure 5:
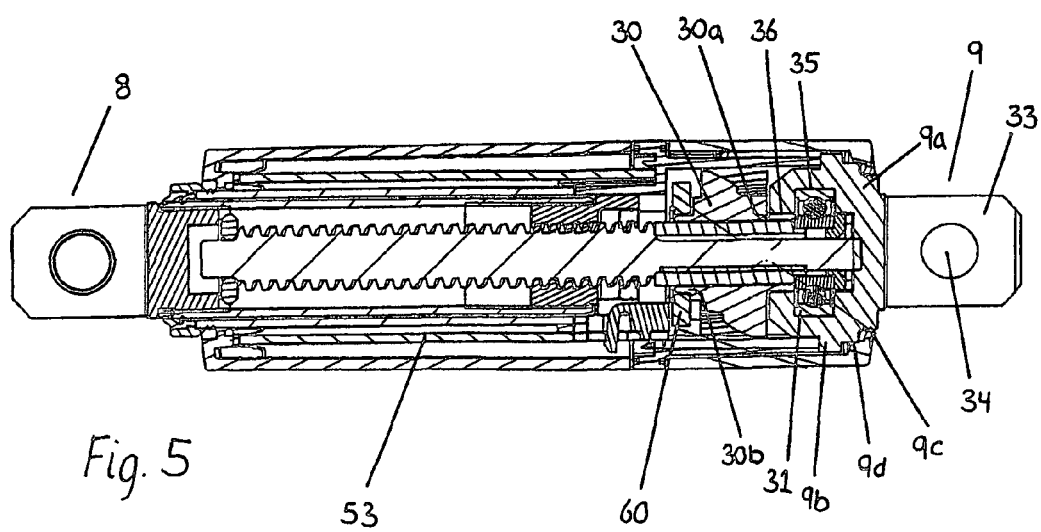
FIG. 5 shows a longitudinal section through the actuator shown from above.

At one side of the cross wall 2a of the mounting console there is a recess 2 (FIG. 4) for receiving the front part of the motor 7. The motor shaft 13 (see FIG. 3) of the motor extends through a corresponding hole 14 in the mounting console 2. The motor 7 is mounted to the mounting console 2 with screws 15.

On the opposite side of the mounting console 2a housing 6 with a first and a second end wall is mounted, where the one end wall is constituted by the cross wall 2a of the mounting console while the other end wall 17, the free end wall, is an independent wall at a distance from the cross wall 2a. Between the two end walls 2a, 17 is arranged a side wall 18, comprising a half circular wall element 18a which at its one end is extended into a short rectilinear wall element 18b and at the other end is extended into another longer rectilinear wall element 18c. In connection with the half circular wall element 18a in the free end wall is arranged a circular opening 19 which is connected to a circular opening 20 in the cross wall 2a of the mounting console. Likewise, the housing 16 has an opening 21 in the side wall between the two rectilinear wall elements 18b, 18c.

A transmission 22 mounted in the housing 16 comprises a first worm gear, the worm 23 of which is secured to the motor shaft 13. The free end of the worm is embedded in a hole 24 functioning as a slide bearing in the free end wail 17 of the housing. Crosswise of the worm 23 a gear unit with a through going axle 25 is arranged. The axle 25 is embedded with its ends in the two rectilinear wall elements 18b, 8c and inclined in the housing 16. In one end, the gear unit is equipped with at worm wheel 26 brought into mesh with the worm 23 at the motor shaft 13. The remaining part of the gear unit is constructed as a second worm 27 with a large thread. The gear unit is led into the housing 16 through the opening 21 in the side wall 18 of the housing.

A shaft end 5a of the spindle is shaped as a D-spline upon which a bushing 28 is arranged. On the bushing 28 is arranged a worm wheel 30 with a large thread brought into mesh with the worm 27 with the large thread on the gear unit by means of a spline connection 29. Thus, the spindle 5 is driven by the motor 7 over a transmission with two worm gears 23,26;27,30 where one of the worm gears 26 and one of the worms 27 are moulded as a plastic component in one piece. Furthermore, the worm wheel 30 on the spindle 5 is also made of plastic. In that way a large gearing in the transmission is achieved, likewise, it is self-locking and thus prevents or locks the spindle 5 against rotation when the load on the activation rod 4 attempts to rotate the spindle 5.

On the outer end of the spindle 5 up against the worm wheel 30 a ball bearing 31 is located, which with one side is extended over a stepped down end 28a of the bushing 28. On the other side, the free side of the bearing 31, a disc 32 with a D-shaped opening which extends over the end of the spindle is located. The disc 32 is equipped with a hub protruding into the opening of the ball bearing and stabilizes it. The outer end of the spindle 5 is shaped as a rivet head for retaining the disc 32 and the bushing 28 on the D-shaped shaft end 5a of the spindle 5.

The rear mounting 9 is furnished with a circular part 9a the outer end of which, the free end, is here equipped with a fork fitting 33 having a through hole 34 for a bolt or a shaft piece, but it might as well have been a flange with a through hole. On the opposite side, the inner side of the rear mounting 9, protruding into the housing 1 a recess 35 which is shaped as a seat for the ball bearing 31 is located. This recess 35 is connected to an opening 36, functioning as seat for a cylindrical collar 30a on the rear side of the worm wheel 30 (FIG. 6). The recess 35 for the ball bearing 31 and the opening 36 for the cylindrical collar 30a on the worm wheel 30 are connected to an opening 37 on the side of the rear mounting 9, providing a U-shaped channel, such that the rear mounting can be extended sideways over the ball bearing 31 and the collar 30a on the worm wheel 30. The opening 37 may be closed by means of an arc-shaped closing element 38, which with a tongue 38a at each side, fits into a spline 37a at the side of the opening 37. The closing element 38 is designed as a section in the circular part 9a of the rear mounting 9. The circular part 9a of the rear mounting fits into the circular opening 19 of the free end wall 17 of the housing 16 on the mounting console 2 and abuts the rim of the circular opening 19 with the edge of a circular collar 9b, which moreover functions as a stop for how far the circular part 9a of the rear mounting 9 extends into the housing 16. As the spindle 5 with the bail bearing 31 is embedded in the rear mounting 9, the position of the spindle in proportion to the mounting console 2 is thus precisely determined.

At the back end of the rear part 1b of the housing 1 a circular hole 39 is located through which the rear mounting 9 with the fork fitting 33 extends. Internally in the housing on the rim along the opening 39, a row of teeth 40 is arranged more precisely forty-eight teeth. At the rear mounting 9 in connection with the circular collar 9b is arranged a stepping with two steps, of which the first step 9c is extended through the opening 39 of the housing while at the other step 9d two mutually facing sections 41a,41b with teeth are arranged corresponding to the teeth 40 at the opening 39 of the housing. One of the sections with teeth 41 a is arranged at the closing element 38. The arrangement of teeth allows the rear mounting and thus the fork fitting 33 can be rotated into a random angle position with intervals of 7.5°.

The outer tube 3 is composed of a an aluminum tube with an almost square cross section as two diametrically located edges 3a are shaped as a soft circular arc while the two other edges 3b are sharper i.e. with a smaller radius of curvature. In each of these two corners 3b a screw channel 42 is arranged. The inner end, the end of the tube 3 protruding farthest into the housing, is riding at the edge of a tube shaped socket 43 on the mounting console 2. Basically, the tube shaped socket 43 is shaped in accordance with the shape of the outer tube 3. The outer tube 3 is fastened to the mounting console 2 by means of screws which are screwed into the screw channels 42 of the outer tube 3 from the opposite side of the mounting console 2. In order to be able to guide the outer tube during the mounting process, the outer side of the tube shaped socket 43 is equipped with a number of guide pins 43a. The outer tube 3 extends with its outer end through an opening 44 in the front of the front part of the housing. In order to prevent penetration of water between the outer tube and the housing a sealing is arranged in the opening.

The activation element 4 comprises a tube section the inner end of which, i.e. the end located inside the housing comprises an inner threaded part by means of which it is screwed onto the spindle nut 6 the outer side of which for the purpose is equipped with a thread 6a. The front mounting 8 is secured to an outer end of the activation element 4, i.e. the end of the tube section which is extended out of the front part of 1 the housing 1. The front mounting 8 is here equipped with a fork fitting 45 with a through hole comprising two bushings 46 for a mounting bolt or a shaft, it might as well be constructed as a butt strap with a through hole just like the rear mounting. The other end of the front mounting 8 is constructed as a threaded part 8a by which it is screwed onto the tube section 4 which for the purpose is equipped with an inner thread. The position of the fork fitting can be adjusted stepless by simply turning the tube section 4 in its thread on the spindle nut. The thread coupling between the front mounting 8 and the tube section 4 is sealed so that water cannot penetrate into the actuator this way.

For guidance of the inner end of the tube shaped activation element 4 in the outer tube 3, the spindle nut 6 is partly furnished with a neck 47, partly with guide surfaces 47a which are guiding against the inner side of the outer tube 3, and partly with guide bosses 47b which are guiding in axially running guides 3a, constructed for the purpose, inside the outer tube. Moreover, the guide bosses 47b function together with the guide surfaces 47a as rotation protection for the spindle nut 6 so this is secured against rotation and thus will be moved in and out on the spindle 5 dependent of the direction of rotation of the spindle. To prevent the spindle nut 6 from moving off the spindle 5, i.e. over the front of the spindle a mechanical stop shaped as a secured circular disc 48 is mounted on the front of the spindle. At the front of the outer tube 3 an end plug 49 is fastened with screws which are screwed into the screw channels 42 in the outer tube 3. The end plug 49, which moreover is sealed against the end of the outer tube 3, has a central opening 50 for the tube shaped activation element 4 which is functioning as a guide for it. The activation element 4 is thus guided in the outer tube 3 both at its rear end and at the front of the outer tube. The opening of the end plug 49 is equipped with sealings in the form of o-rings for the activation element 4 to prevent water to penetrate into the actuator. One of the soft curved corners 3a of the outer tube 3 has two guides 51 for a strip shaped activation rod 52 which has an opening 52a at the rear part and a dog 52b in the form of an embossing at the front part. When the activation element 4 is brought into its outermost position, a guide boss 47b on the spindle nut 6 will hit the dog 52b and pull the activation rod 52 along until the motor stops.

At the front of the mounting console 2 edgeways at the side of the outer tube 3, a circuit board 53 with switches is arranged. The end of the circuit board rests against the tube shaped socket 43 on the mounting console 2, and the front edge is fixed between its side and pins on the mounting console 2. The circuit board 53 has a hole 53a for insertion over a pin 43b at the side of the tube shaped socket 43 such that the circuit board 53 is secured in the axial direction as well as in the sideways direction. On the circuit board 53 two end stop switches 54, 55 are arranged below a longitudinal displaceable housing 56 which with a leg 56a at each end reaches into the guide 53b in the circuit board 53. The housing 56 is spring-loaded by a coil spring 57 to occupy a neutral position in which none of the end stop switches 54,55 are activated. The coil spring 57 is arranged in a groove in the circuit board. Each end of the groove is connected to a guide through which two tabs 56b are arranged on the housing between which the coil spring 57 is embedded. On one side of the housing 56 is an arm 58 which is extended into the hollow of the tube shaped socket 43 through an opening. The aforementioned strip shaped activation rod 52 in the outer tube 3 is attached to the arm 58 with the opening 52a. When the activation element 4 reaches its outermost end position the displacement of the activation rod 52 will pull the housing 56 along and activate the corresponding end stop switch 55. This happens in that the ceiling 56a of the housing is countersunk at the ends such that the contact on the end stop switch 55 is pressed down when it passes over the end stop switch 55. By activating the end stop switch 55 the motor will be stopped by switching off the power for it by means of guide electronics (not shown). At the inner retracted end position of the activation element 4 a guide boss 47a on the spindle nut 6 hits the arm 58 and thus pulls the housing 56 along and activates the other end stop switch 54. Again the power for the motor is switched off by the guide electronics. On the other side of the circuit board 53 two positions switches 57a, 57b are arranged which will be activated by the tab 56b on the housing 56. These position switches signal to the control unit about which end position the activation element 4 is in. Note that the position switches 57a, 57b are expendable if it is not necessary to know which end position the activation element 4 are in. Also note that the end stop switches 54, 55 can function as power switches which cut off the current to the motor 7 in order to simplify the guide electronics. However, it is often a strong wish that the mains voltage is kept as far from the actuator as possible for safety reasons.

Further, it is noted that if necessary the spindle nut 6 may be equipped with a metal safety nut 59, applied in a groove at the end of the spindle nut 6 which typically is made of plastic in order to dampen noise. When the actuator is only exposed to pressure load only one safety nut 59 at the rear end of the spindle nut 6 is required, and when the actuator is only exposed to tensile load, only a safety nut at the front of the spindle nut is required. When the actuator is exposed to both pressure load and tensile load a safety nut can be arranged at each end.

The determination of the position of the activation element 4 may, as mentioned above, be done in different ways, e.g. with a Hall-element arranged on the printed circuit board 53. At a collar 30b at the front of the worm wheel 30 on the spindle 5 a magnet ring 60 with more poles is embedded, which triggers the Hall-element each time a pole passes it. The magnet ring 60 is retained in its position by a locking ring 61.

For the sake of completeness it is noted that 62 is a plug from the control device which is connected to the socket of the circuit board 64 through a gateway 63 in the outer housing. The gateway 63 is arranged in a countersunk area on the housing. To prevent the plug 62 from unintentionally being pulled out it can be locked by a locking element 65 which constitutes part of the front part 1a of the housing. At a lower edge of the housing 1, a groove shaped notch for a cable 66 for the plug 62. The cable 66 is secured by a clamp 67 arranged in the corner of the mounting console. The cable thus lies within the circumscribed rectangle of the housing and is thus properly protected.

The invention thus provides a linear actuator which provides the possibility of low manufacturing costs while the actuator still maintains a high quality and strength as well as a high degree of flexibility in terms of accessories and mounting brackets (front and rear mounting).

The invention claimed is:
1. A linear actuator comprising:
a housing,
a reversible electric motor,
a transmission,
a spindle driven by the electric motor through the transmission,
a bearing at a shaft end of the spindle,
a spindle nut secured against rotation on the spindle,
an outer tube surrounding the spindle,
an activation element connected to the spindle nut, and
a rear mounting designed as a separate element and secured in the housing for mounting of the actuator, the rear mounting including a recess forming a seat, a first opening which extends to an end of the rear mounting through which the shaft end of the spindle can extend with the bearing, and a second opening which extends laterally of the first opening and outwardly to a side of the rear mounting so that the bearing can be inserted sideways into the rear mounting and against the seat, wherein said seat, said first opening and said second opening provide a U-shaped channel, and including a closing element closing the U-shaped channel, and wherein the closing element fits into the U-shaped channel and slides along the U-shaped channel to contact a spindle bearing located therein.

2. The linear actuator according to claim 1, wherein the dosing element comprises a tongue at each side, which fits into a spline in the side of the second opening.

3. The linear actuator according to claim 1, including a circular opening in the housing into which the rear mounting protrudes and inside the housing, on a rim along the opening, is a row of teeth, and on the rear mounting, at least over a section, is a corresponding row of teeth which cooperates with the teeth in the housing, such that the rear mounting is secured against unintended rotation about its axial axis.

4. The linear actuator according to claim 3, wherein the rear mounting comprises two sections with teeth located opposite each other.

5. The linear actuator according to claim 4, wherein one of the sections with teeth is constructed on the closing element.

6. The linear actuator according to claim 1, wherein the closing element is arc-shaped.

* * * * *

UNITED STATES PATENT AND TRADEMARK OFFICE
CERTIFICATE OF CORRECTION

PATENT NO. : 9,312,738 B2
APPLICATION NO. : 13/509335
DATED : April 12, 2016
INVENTOR(S) : Winther et al.

Page 1 of 1

It is certified that error appears in the above-identified patent and that said Letters Patent is hereby corrected as shown below:

In the Claims

Column 7, line 12, replace the term "dosing" with --closing--.

Signed and Sealed this
Seventh Day of June, 2016

Michelle K. Lee
*Director of the United States Patent and Trademark Office*